United States Patent
Wang et al.

(10) Patent No.: US 7,853,444 B2
(45) Date of Patent: Dec. 14, 2010

(54) METHOD AND APPARATUS FOR TRAINING TRANSLITERATION MODEL AND PARSING STATISTIC MODEL, METHOD AND APPARATUS FOR TRANSLITERATION

(75) Inventors: Haifeng Wang, Dong Cheng District (CN); Yuqing Guo, Dong Cheng District (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 1104 days.

(21) Appl. No.: 11/539,435

(22) Filed: Oct. 6, 2006

(65) Prior Publication Data
US 2007/0124133 A1 May 31, 2007

(30) Foreign Application Priority Data
Oct. 9, 2005 (CN) ......................... 2005 1 0108185

(51) Int. Cl.
*G06F 17/28* (2006.01)
*G06F 17/20* (2006.01)
*G10L 21/00* (2006.01)
(52) U.S. Cl. .................. 704/2; 704/8; 704/277
(58) Field of Classification Search ............. None
See application file for complete search history.

(56) References Cited
U.S. PATENT DOCUMENTS
5,432,948 A * 7/1995 Davis et al. .............. 704/2

6,810,374 B2 * 10/2004 Kang ......................... 704/2
7,610,189 B2 * 10/2009 Mackie ....................... 704/9
2007/0021956 A1 * 1/2007 Qu et al. ..................... 704/8

OTHER PUBLICATIONS

Oh et al., "A Statistical Model for Automatic Extraction of Korean Transliterated Foreign Words", International Journal of Computer Processing of Oriental Languages, vol. 16, No. 1, pp. 41-62, 2003.*
Lee et al., "A Statistical Approach to Chinese-to-English Back-Transliteration", Language, Information and Computation : Proceedings of the 17th Pacific Asia Conference, pp. 310-318, Oct. 2003.*

(Continued)

*Primary Examiner*—Brian L Albertalli
(74) *Attorney, Agent, or Firm*—Oblon, Spivak, McClelland, Maier & Neustadt, L.L.P.

(57) ABSTRACT

The present invention provides a method and apparatus for training a parsing statistic model, a method and apparatus for transliteration. Said parsing statistic model is to be used in transliteration between a single-syllable language and a multi-syllable language and includes sub-syllable parsing probabilities of said multi-syllable language. Said method for training the parsing statistic model comprising: inputting a bilingual proper name list as corpus, said bilingual proper name list includes a plurality of proper names of said multi-syllable language and corresponding proper names of said single-syllable language respectively; parsing each of said plurality of proper names of multi-syllable language in said bilingual proper name list into a sub-syllable sequence using parsing rules; determining whether said parsing is correct according to the corresponding proper name of said single-syllable language in said bilingual proper name list; and training said parsing statistic model base on the result of parsing that is determined as correct.

14 Claims, 8 Drawing Sheets

OTHER PUBLICATIONS

Guo et al., "Chinese-to-English Backward Machine Transliteration", Companion Volume to the Proceedings of IJCNLP-04, pp. 17-20, Mar. 2004.*

Wan et al., "Automatic English-Chinese name transliteration for development of multilingual resources", In Proceedings of COLING-ACL'98, the joint meeting of 17th International Conference on Computational Linguistics and the 36th Annual Meeting of the Association for Computational Linguistics, 1998.*

* cited by examiner

METHOD AND APPARATUS FOR TRAINING TRANSLITERATION MODEL AND PARSING STATISTIC MODEL, METHOD AND APPARATUS FOR TRANSLITERATION

TECHNICAL FIELD OF THE INVENTION

The invention relates to information processing technology, specifically, to the technology for transliteration by using a computer and the technology for training a transliteration model used during transliteration and parsing the model.

BACKGROUND OF THE INVENTION

So-called "transliteration" is to translate a word in one language into a word with a similar pronunciation in another language. For instance, a transliteration method is often used in translating a proper name. Previously, people usually use a bilingual lexicon to translate proper name. Such a bilingual lexicon (e.g., a bilingual proper name lexicon) is compiled by linguists or specialists in related fields, which has very high accuracy.

However, even a very large bilingual lexicon cannot cover the whole vocabulary, very often people would encounter a case in which a wanted word cannot be found in a lexicon. Furthermore, with the development of time and society, new words are emerging continuously, making the situation even worse. Therefore, for a long time, people need a method and apparatus for automatic transliteration to realize automatic transliteration between two languages. Such an automatic transliteration technology is also important to machine translation, cross language information retrieval and information extraction.

The existing automatic transliteration technology is described, for example, in the article entitled "Transliteration of Proper Names in Cross-Lingual Information Retrieval", Paola Virga and Sanjeev Khudanpur, Proceedings of 41st ACL Workshop on Multilingual and Mixed-language Named Entity Recognition, pp. 57-64, 2003. The article describes a statistic machine translation technology based English to Chinese transliteration method, the specific steps of which are shown in the following Table 1, comprising:

(1) transforming English words into a phone sequence that represents pronunciation by using the Festival voice synthesis system developed by CMU;

(2) transforming the English phone sequence into an initials and finals sequence that represents the pronunciation of Chinese characters by using the IBM translation model;

(3) combining the initials and finals sequence into Chinese Pinyin syllables;

(4) transforming the Chinese Pinyin into Chinese characters by using the IBM translation model again;

(5) combining the Chinese characters into Chinese transliterated words by using a language model developed by CMU.

TABLE 1

| English proper name | Frances Taylor | | | | | | | | | |
|---|---|---|---|---|---|---|---|---|---|---|
| English phone | F | R AE N S | IH S | | T EY | L | ER | | | |
| initials and finals | F U | L ANG | X I | S I | T AI | L | E | | | |
| Chinese Pinyin | FU | LANG | XI | SI | TAI | LE | | | | |
| Chinese transliterated word | 弗 | 朗 | 西 | 丝 | 泰 | 勒 | | | | |

There are two problems in above-mentioned automatic transliteration method:

(1) a voice synthesis system is needed to help to transform English words into a pronunciation sequence, which would introduce additional errors during transliteration due to the fact that the existing voice synthesis technology is immature; and since the size of a lexicon is limited, the method of marking English word pronunciation with a pronunciation lexicon is unable to solve the problem of marking a word that is out of the lexicon, especially, this problem becomes prominent for proper names and newly emerged words that need to be transliterated.

(2) English is a multi-syllable language (that is, one English word usually contains multiple syllables), while Chinese is a single-syllable language (that is, one Chinese character is one syllable), neither English letter, phone, syllable nor word could correspond to the natural unit of Chinese—Chinese character. Therefore, the method in the above article is only suitable for English to Chinese transliteration, but not suitable for Chinese to English transliteration.

SUMMARY OF THE INVENTION

In order to solve the above mentioned problems in prior art, the invention provides a method and apparatus for training a parsing statistic model and a transliteration model, as well as a method and apparatus for transliteration from a single-syllable language to a multi-syllable language and from a multi-syllable language to a single-syllable language.

According to one aspect of the invention, there is provided a method for training a parsing statistic model, which is to be used in transliteration between a single-syllable language and a multi-syllable language and includes sub-syllable parsing probabilities of said multi-syllable language, comprising: inputting a bilingual proper name list as corpus, said bilingual proper name list includes a plurality of proper names of said multi-syllable language and corresponding proper names of said single-syllable language respectively; parsing each of said plurality of proper names of multi-syllable language in said bilingual proper name list into a sub-syllable sequence using parsing rules; determining whether said parsing is correct according to the corresponding proper name of said single-syllable language in said bilingual proper name list; and training said parsing statistic model base on the result of parsing that is determined as correct.

According to another aspect of the invention, there is provided a method for training a parsing statistic model and a transliteration model, which are to be used in transliteration between a single-syllable language and a multi-syllable language, said parsing statistic model includes sub-syllable parsing probabilities of said multi-syllable language, said transliteration model includes translation relationships between syllables of said single-syllable language and sub-syllables of said multi-syllable language and their translation probabilities respectively, said method comprises: training said parsing statistic model using the method mentioned above; and training said transliteration model based on the proper names of multi-syllable language that are determined as correctly parsed and the corresponding proper names of single-syllable language in said bilingual proper name list.

According to another aspect of the invention, there is provided a method for transliteration from a single-syllable language to a multi-syllable language, comprising: obtaining a syllable sequence corresponding to a word of said single-syllable language to be transliterated; obtaining at least one sub-syllable of said multi-syllable language corresponding to each syllable in said syllable sequence and its translation probability according to a transliteration model including translation relationships between syllables of said single-syllable language and sub-syllables of said multi-syllable language and their translation probabilities respectively; searching for a sub-syllable sequence having the highest probability corresponding to said syllable sequence as a transliteration result based on a parsing statistic model including sub-syllable parsing probabilities of said multi-syllable language.

According to another aspect of the invention, there is provided a method for transliteration from a multi-syllable language to a single-syllable language, comprising: parsing a word of said multi-syllable language that needs to be transliterated into a sub-syllable sequence; obtaining at least one syllable of said single-syllable language corresponding to each sub-syllable in said sub-syllable sequence and its translation probability according to a transliteration model including translation relationships between syllables of said single-syllable language and sub-syllables of said multi-syllable language and their translation probabilities respectively; obtaining a character corresponding to each said syllable of single-syllable language; searching for a character sequence having the highest probability corresponding to said sub-syllable sequence as a transliteration result based on a language model including character adjacent probabilities of said single-syllable language.

According to another aspect of the invention, there is provided an apparatus for training a parsing statistic model, which is to be used in transliteration between a single-syllable language and a multi-syllable language and includes sub-syllable parsing probabilities of said multi-syllable language, comprising: a corpus inputting unit configured to input a bilingual proper name list as corpus, said bilingual proper name list includes a plurality of proper names of said multi-syllable language and corresponding proper names of said single-syllable language respectively; a rule parsing unit configured to parse said plurality of proper names of multi-syllable language in said bilingual proper name list into sub-syllable sequences using parsing rules; a parsing determining unit configured to determine whether a parsing of said proper name of multi-syllable language is correct according to the corresponding proper name of said single-syllable language in said bilingual proper name list; and a parsing statistic model training unit configured to train said parsing statistic model base on the result of parsing that is determined as correct.

According to another aspect of the invention, there is provided an apparatus for transliteration from a single-syllable language to a multi-syllable language, comprising: a syllable sequence obtaining unit configured to obtain a syllable sequence corresponding to a word of said single-syllable language to be transliterated; a transliteration model including translation relationships between syllables of said single-syllable language and sub-syllables of said multi-syllable language and their translation probabilities respectively; a sub-syllable translating unit configured to obtain at least one sub-syllable of said multi-syllable language corresponding to each syllable in said syllable sequence obtained by said syllable sequence obtaining unit and its translation probability by using said transliteration model; a parsing statistic model including sub-syllable parsing probabilities of said multi-syllable language; a searching unit configured to search for a sub-syllable sequence having the highest probability corresponding to said syllable sequence as a transliteration result based on said parsing statistic model and said at least one sub-syllable of said multi-syllable language corresponding to each syllable in said syllable sequence and its translation probability.

According to another aspect of the invention, there is provided an apparatus for transliteration from a multi-syllable language to a single-syllable language, comprising: a sub-syllable parsing unit configured to parse a word of said multi-syllable language that needs to be transliterated into a sub-syllable sequence; a transliteration model including translation relationships between syllables of said single-syllable language and sub-syllables of said multi-syllable language and their translation probabilities respectively; a syllable translating unit configured to obtain at least one syllable of said single-syllable language corresponding to each sub-syllable in said sub-syllable sequence and its translation probability according to said transliteration model; a character translating unit configured to obtain a character corresponding to each said syllable of single-syllable language; a language model including character adjacent probabilities of said single-syllable language; a searching unit configured to search for a character sequence having the highest probability corresponding to said sub-syllable sequence as a transliteration result based on said language model and said at least one syllable of said single-syllable language corresponding to each sub-syllable in said sub-syllable sequence and its translation probability obtained by said syllable translating unit.

BRIEF DESCRIPTION OF THE DRAWINGS

It is believed that the features, advantages and purposes of the present invention will be better understood from the following description of the detailed implementation of the present invention taken in conjunction with the accompanying drawings, in which.

DETAILED DESCRIPTION OF THE PREFERRED EMBODIMENTS

Next, various preferred embodiments of the invention will be described in detail in conjunction with accompany drawings.

In order to avoid additional errors in the prior art caused by marking pronunciation for words in a multi-syllable language, the invention employs a manner that directly use words of the multi-syllable language, such as English words, to perform transliteration. For this purpose, a concept of sub-syllable is proposed in the invention. For a multi-syllable language, such as English, a sub-syllable is a unit between an English letter and a syllable, it corresponds to the syllable of a word in a corresponding single-syllable language, such as Chinese, one-by-one, as shown in Table 2.

TABLE 2

| Chinese Pinyin syllable: | 克 | 里 | 斯 | 托 | 弗 |
|---|---|---|---|---|---|
| | KE | LI | SI | TUO | FU |
| | \| | \| | \| | \| | \| |
| English sub-syllable: | Ch | ri | s | to | pher |

The method for automatic transliteration of the invention takes syllables of a single-syllable language and sub-syllables of a multi-syllable language as basic unit to realize bi-directional transliteration by using a statistic model. The present specification takes English as an example of the multi-syllable language and Chinese as an example of the single-syllable language to describe embodiments of the invention. It should be noted that, for other single-syllable languages and multi-syllable languages, such as Chinese-French, Chinese-German, Japanese-English, Japanese-German, etc., the invention is also applicable.

Figure 1:
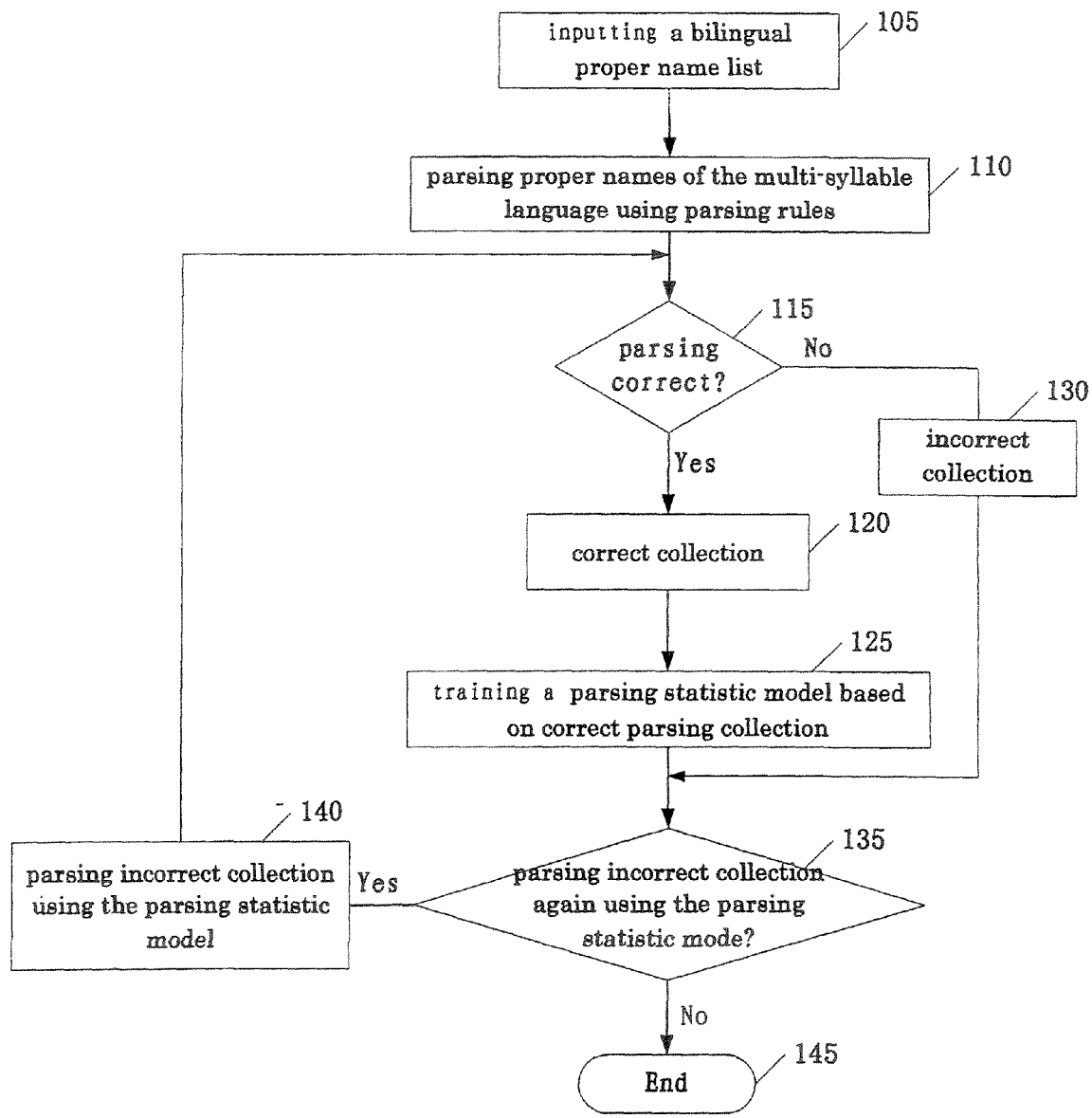
FIG. 1 is a flowchart of the method for training a parsing statistic model according to one embodiment of the invention.

FIG. 1 is a flowchart of the method for training a parsing statistic model according to one embodiment of the invention. The parsing statistic model trained by the method of the present embodiment will be used in the method and apparatus for transliteration described later in conjunction with other embodiments, wherein the model contains sub-syllable parsing probabilities of a multi-syllable language.

As shown in FIG. 1, first at Step 105, a bilingual proper name list is inputted as corpus, wherein the bilingual proper name list includes a plurality of proper names of a multi-syllable language and corresponding proper names of a single-syllable language respectively. Specifically, for instance, a bilingual proper name lexicon compiled by linguists or specialists in related fields may be used as corpus. Table 3 shows an example of an English-Chinese bilingual proper name list.

TABLE 3

| English proper name | Chinese translation |
|---|---|
| MARY | 玛丽 |
| PATRICIA | 帕格丽夏 |
| ELIZABETH | 伊丽莎白 |
| . | . |
| . | . |
| . | . |
| SUSAN | 苏珊 |
| MARGARET | 玛格丽特 |
| DOROTHY | 多罗西 |
| . | . |
| . | . |
| . | . |

Next, at Step 110, each of the plurality of proper names of the multi-syllable language in the bilingual proper name list is parsed into a sub-syllable sequence using parsing rules. Following is a segment of parsing rules used in the present embodiment:

// parsing a vowel that includes 4 letters
if "augh" is located inside a word, it is parsed as a sub-syllable;
if "ough" is located inside a word or at the end of a word, it is parsed as a sub-syllable;
......
// parsing a vowel that includes 3 letters
if "ore" is located at the end of a word, it is parsed as a sub-syllable;
......
// parsing a vowel that includes 2 letters
if "ai" is located at the beginning of a word or inside a word, it is parsed as a sub-syllable;
if "ey" is located at the end of a word, it is parsed as a sub-syllable;
......
// parsing vowel letters
vowel letters "a", "e", "i", "o", "u", "y" in a word are parsed as sub-syllables
// other rules
"sh", "th", "tch", "ph", "ch" and "wh" are parsed as a consonant unit, respectively;
a vowel letter and its immediately left consonant letter are combined into one sub-syllable;
......

Next, at Step 115, it is determined whether said parsing is correct according to the corresponding proper name of said single-syllable language in said bilingual proper name list. Specifically, in the present embodiment, it is determined whether the number of sub-syllables in said sub-syllable sequence parsed from said proper name of said multi-syllable language is equal to the number of syllables in said corresponding proper name of single-syllable language in said bilingual proper name list, and if it is equal, the parsing is determined as correct, otherwise the parsing is determined as incorrect. Those correct parsing results are collected into a correct parsing collection (Step 120), and those incorrect parsing results are collected into an incorrect parsing collection (Step 130).

Then, at Step 125, said parsing statistic model is trained based on the correct parsing results. Specifically, in the present embodiment, an occurrence probability of each pair of adjacent sub-syllables is calculated based on the adjacent relationships among sub-syllables in the sub-syllable sequences parsed from said proper names of multi-language that are correctly parsed, and the sub-syllable pairs and their occurrence probabilities are recorded in the parsing statistic model. Table 4 shows an example of the parsing statistic model.

TABLE 4

| Sub-syllable | Sub-syllable | Adjacent probability |
|---|---|---|
| a | la | 0.285714 |
| a | ri | 0.142857 |
| . | . | . |
| . | . | . |
| . | . | . |
| ae | ro | 0.142857 |
| . | . | . |
| . | . | . |
| . | . | . |

Here, it should be noted that there may be several methods for calculating occurrence probability of a sub-syllable pair in a parsing statistic model, for example, in the present embodiment, as shown in Table 4, what is employed is a ratio derived from dividing occurrence number of the sub-syllable pair by the total occurrence number of the first sub-syllable in that sub-syllable pair. Of course, other approaches can be used, for example, a ratio derived from dividing occurrence number of the sub-syllable pair by the total occurrence number of the second sub-syllable in that sub-syllable pair, or a ratio derived from dividing occurrence number of the sub-syllable pair by the total occurrence number of the first and second sub-syllable in that sub-syllable pair, etc.

Until Step 125, the method of the present embodiment can obtain (train) a parsing statistic model. The parsing statistic model records therein adjacent relationships among sub-syllables of the multi-syllable language parsed from the corpus and their occurrence probabilities.

Further, at Step 135, if it is desired to parse the proper names of the multi-syllable language in the incorrect collection again using the parsing statistic model, the process proceeds to Step 140; otherwise to Step 145 where the process ends.

At Step 140, the proper names of the multi-syllable language in the incorrect collection are parsed according to the parsing statistic model. Specifically, a sub-syllable sequence having the highest probability corresponding to the proper names of the multi-syllable language is calculated with a search algorithm based on the occurrence probabilities of each sub-syllable pair in the parsing statistic model. In the present embodiment, said search is performed with Viterbi algorithm. For information about the Viterbi algorithm, please see "Error bounds for convolutional codes and an asymptotically optimum decoding algorithm", A. J. Viterbi, IEEE Trans. Inform. Theory, IT-13(2), pp. 260-269, 1967.

In addition, other search algorithms may be used, such as A* algorithm, depth first search and breadth first search, etc. These algorithms may also be used in combination.

Next, returns to Step 115, it is determined whether the parsing with the parsing static model is correct, and the correct results are added into the correct collection (Step 120), the incorrect results are added into the incorrect collection (Step 130), and Step 125 is repeated.

Thus, in the present embodiment, the parsing statistic model can be used repeatedly to parse the incorrect collection, so as to further train the adaptability of the parsing statistic model.

Figure 2:
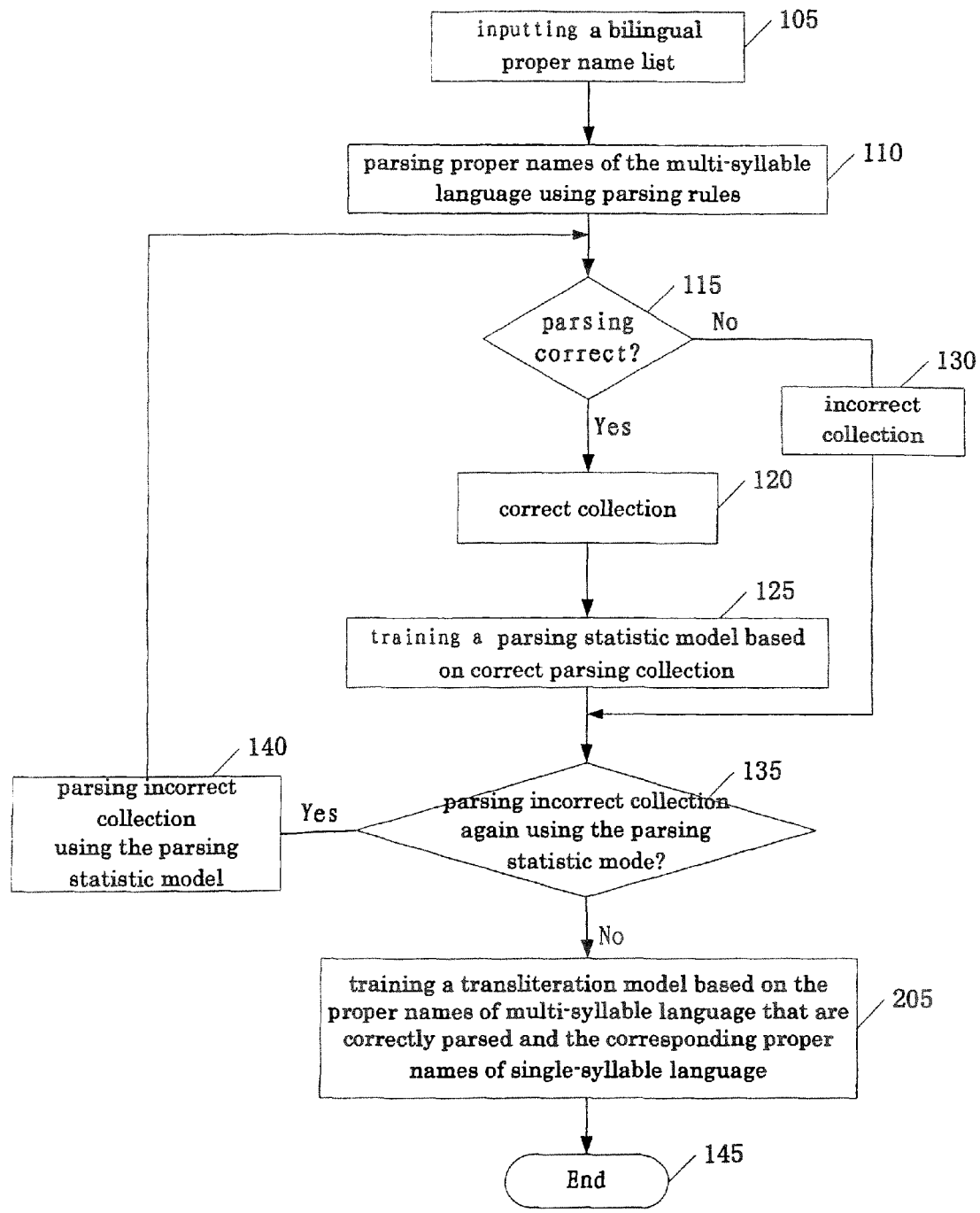
FIG. 2 is a flowchart of the method for training a parsing statistic model and a transliteration model according to one embodiment of the invention.

FIG. 2 is a flowchart of the method for training a parsing statistic model and a transliteration model according to one embodiment of the invention. The present embodiment will be described in the following in conjunction with the drawing. For the same elements as those in the above embodiments, same character is labeled in the drawing and the description of which will be properly omitted.

As shown in FIG. 2, Steps 105~140 of the present embodiment are the same as that of the embodiment shown in FIG. 1. The difference of the present embodiment is in that the process will proceed to Step 205 when the determination of Step 135 is "No".

At Step 205, a transliteration model is trained based on the proper names of multi-syllable language that are determined as correctly parsed and the corresponding proper names of single-syllable language in the bilingual proper name list. Specifically, a translation probability of each sub-syllable/syllable pair is calculated base on the corresponding relationship between each sub-syllable in the sub-syllable sequences parsed from said proper names of multi-syllable language that are determined as correctly parsed and the corresponding syllable in the corresponding proper names of single-syllable language; and said each sub-syllable/syllable pair and its translation probability are recorded in said transliteration model. Table 5 shows an example of the transliteration model.

TABLE 5

| Chinese syllable | English sub-syllable | Probability |
|---|---|---|
| AI | a | 0.0261541 |
| AI | ae | 0.00149677 |
| AI | ah | 0.000157555 |
| AI | ai | 0.0435639 |
| . | . | . |
| . | . | . |
| . | . | . |
| WU | gu | 0.0140743 |
| WU | u | 0.52278 |
| . | . | . |
| . | . | . |
| . | . | . |

Similar to the case of calculating the parsing probability in the above, there are several methods for calculating the translation probability of said sub-syllable/syllable pair in the transliteration model, for example, in the present embodiment, as shown in Table 5, what is employed is a ratio derived from dividing the occurrence number of the sub-syllable/syllable pair by the total occurrence number of that sub-syllable of the multi-syllable language. Of course, other approaches can be used, for example, a ratio derived from dividing the occurrence number of the sub-syllable/syllable pair by the total occurrence number of that sub-syllable of the multi-syllable language and that syllable of the single-syllable language, or a ratio derived from dividing the occurrence number of the sub-syllable/syllable pair by the total occurrence number of that syllable of the single-syllable language, etc.

From the above description it can be known that with the method of the present embodiment, a bilingual proper name list can be used as corpus to obtain (train) a parsing statistic model and a transliteration model at the same time. The parsing statistic model records therein adjacent relationships among sub-syllables of the multi-syllable language parsed from the corpus and their probabilities. The transliteration model records therein corresponding relationships between syllables of single-syllable language and sub-syllables of multi-syllable language parsed from the corpus and their probabilities respectively (or referred to as "translation relationships" and "translation probabilities").

Figure 3:
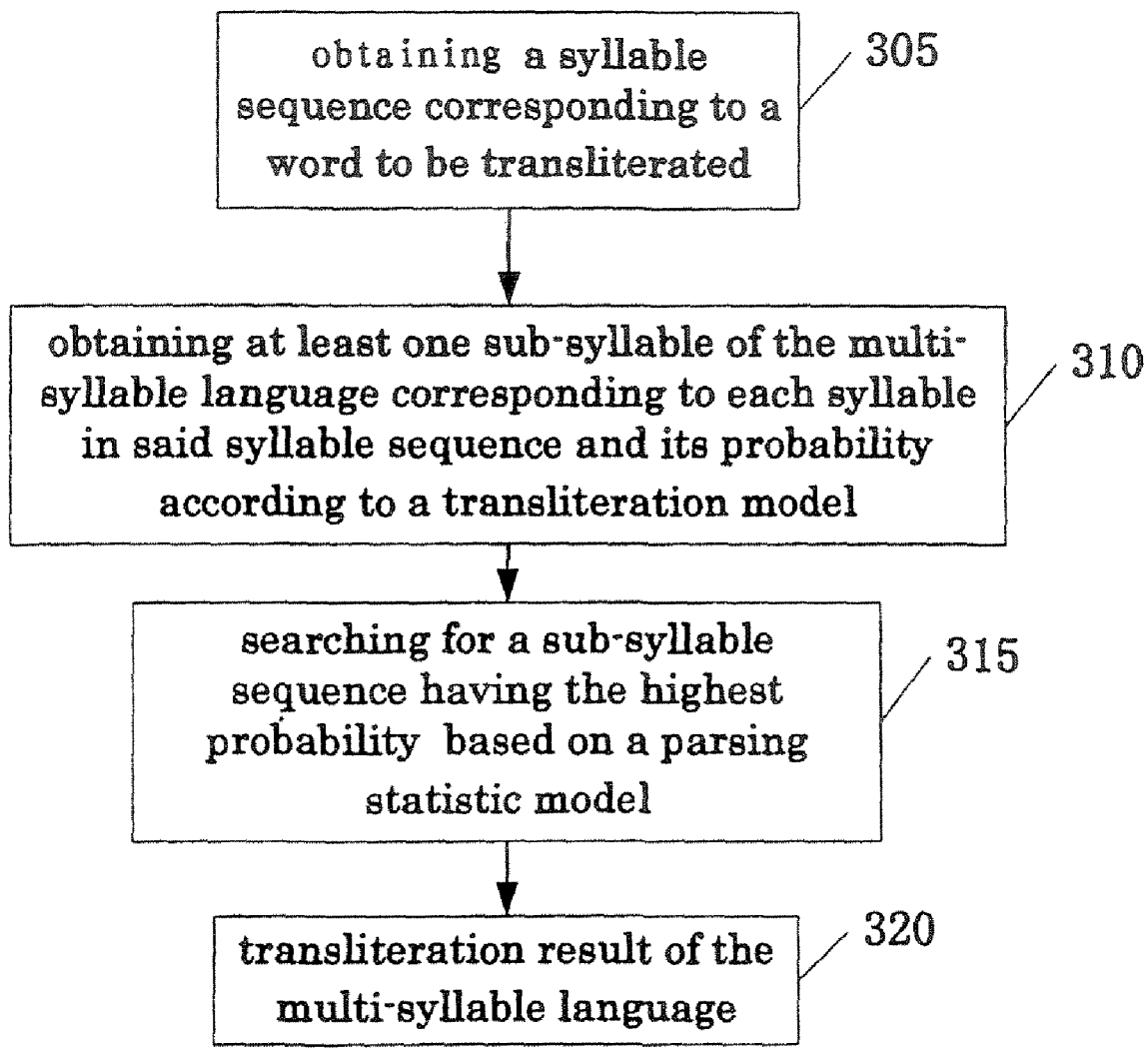
FIG. 3 is a flowchart of the method for transliteration from a single-syllable language to a multi-syllable language according to one embodiment of the invention.

FIG. 3 is a flowchart of the method for transliteration from a single-syllable language to a multi-syllable language according to one embodiment of the invention. The present embodiment will be described in the following in conjunction with the drawing. For the same elements as those in the above embodiments, the description of which will be properly omitted.

As shown in FIG. 3, first at Step 305, a syllable sequence corresponding to a word of the single-syllable language to be transliterated is obtained. In the present embodiment, a pronunciation lexicon (in the present embodiment, that is, a Chinese character Pinyin lexicon) is used to translate Chinese words to be transliterated into a corresponding syllable sequence. Table 6 shows an example of the pronunciation lexicon.

TABLE 6

| Chinese character | Pinyin/ syllable |
|---|---|
| 啊 | a |
| 阿 | a |

TABLE 6-continued

| Chinese character | Pinyin/ syllable |
|---|---|
| 埃 | ai |
| . | . |
| . | . |
| . | . |
| 豫 | yu |
| 驭 | yu |
| 鸳 | yuan |
| . | . |
| . | . |
| . | . |

Here, it should be noted that, it might not be necessary to use a pronunciation lexicon to translate Chinese words to be transliterated into a corresponding syllable sequence. For instance, in case that a word of the single-syllable language to be transliterated is a Japanese katakana, the katakana sequence may be directly used as a syllable sequence.

Next, at Step 310, at least one sub-syllable of the multi-syllable language corresponding to each syllable in said syllable sequence and its translation probability are obtained according to a transliteration model. The content about a transliteration model has been described in the above embodiments and it will not be repeated here.

Next, at Step 315, a sub-syllable sequence having the highest probability corresponding to said syllable sequence is searched for based on a parsing statistic model. Similar to the searching process in the above embodiments, in the present embodiment, a sub-syllable sequence having the highest probability corresponding to the word of the single-syllable language is calculated with a search algorithm based on the occurrence probability of each sub-syllable pair in the parsing statistic model and the translation probability of the syllable/sub-syllable pair obtained from the above transliteration model. In the present embodiment, said search is performed with the Viterbi algorithm. However, other search algorithms may also be used, such as A* algorithm, depth first algorithm and breadth first algorithm, etc. These algorithms may also be used in combination.

Finally, at Step 320, said sub-syllable sequence is outputted as a transliteration result of the multi-syllable language.

From the above description it can be known that automatic transliteration from a single-syllable language to a multi-syllable language can be efficiently realized by using the method for transliteration from a single-syllable language to a multi-syllable language of the present embodiment, and since there is no need to use voice synthesis to accomplish transliteration processing, reliability and accuracy is improved.

Further, since translation relationships between "sub-syllables" of the multi-syllable language and "syllables" of the single-syllable language and their translation probabilities are recorded in the transliteration model, the automatic transliteration technology of the present invention is able to realize not only the automatic transliteration from a single-syllable language to a multi-syllable language, but also the automatic transliteration from a multi-syllable language to a single-syllable language.

Figure 4:
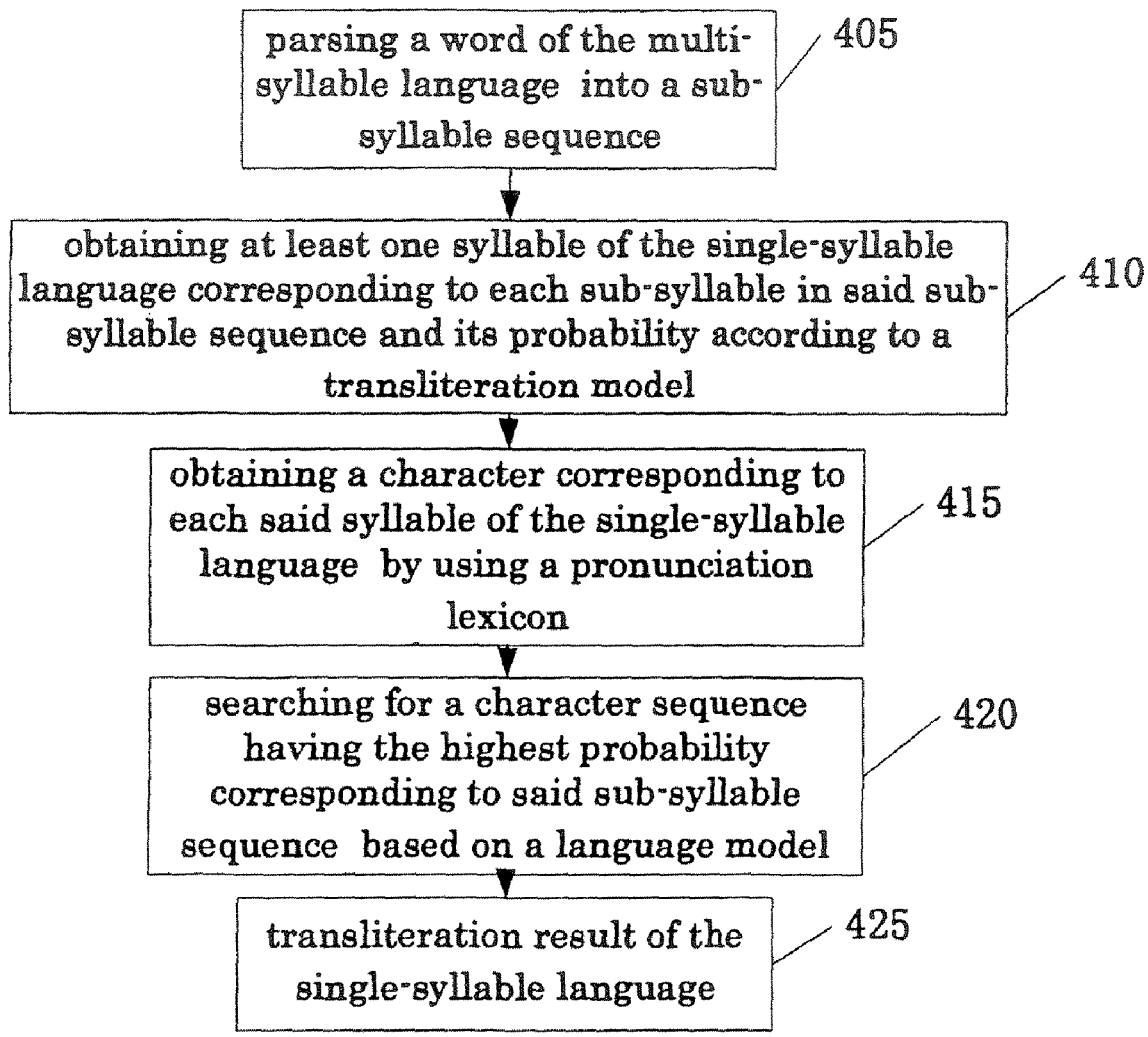
FIG. 4 is a flowchart of the method for transliteration from a multi-syllable language to a single-syllable language according to one embodiment of the invention.

FIG. 4 is a flowchart of the method for transliteration from a multi-syllable language to a single-syllable language according to one embodiment of the invention. The present embodiment will be described in the following in conjunction with the drawing. For the same elements as those in the above embodiments, same character is labeled in the drawing and the description of which will be properly omitted.

As shown in FIG. 4, first at Step 405, a word of the multi-syllable language that needs to be transliterated is parsed into a sub-syllable sequence. Specifically, the parsing may be performed by using parsing rules or by using a parsing statistic model, the description of which have been described in the above embodiments and will not be repeated here.

Next, at Step 410, at least one syllable of the single-syllable language corresponding to each sub-syllable in said sub-syllable sequence and its translation probability are obtained according to a transliteration model.

Next, at Step 415, a character corresponding to each said syllable of the single-syllable language is obtained by using a pronunciation lexicon.

Next, at Step 420, a character sequence having the highest probability corresponding to said sub-syllable sequence is searched for based on a language model of the single-syllable language. Here, the language model of the single-syllable language is similar to the above-mentioned parsing statistic model of the multi-syllable language, in which adjacent relationships among syllables (or characters) of the single-syllable language and their probabilities are recorded. Table 7 shows an example of the language model.

TABLE 7

| Character/ syllable | Character/ syllable | Adjacent probability |
|---|---|---|
| 常 | 德 | 0.142857 |
| 常 | 藤 | 0.142857 |
| 常 | 喜 | 0.285714 |
| . | . | . |
| . | . | . |
| . | . | . |
| 小 | 奥 | 0.00680272 |
| 小 | 八 | 0.0204082 |
| . | . | . |
| . | . | . |
| . | . | . |

Similar to the above mentioned parsing statistic model of the multi-syllable language, there may be several methods for calculating occurrence probability of a syllable pair (character pair) in the language model of the single-syllable language. For instance, in the present embodiment, what is employed is a ratio derived from dividing the occurrence number of the character pair by the total occurrence number of the first character in that character pair. Of course, other approaches can be used, for instance, a ratio derived from dividing the occurrence number of the character pair by the total occurrence number of the second character in that character pair, or a ratio derived from dividing the occurrence number of the character pair by the total occurrence number of the first and second characters in that character pair, etc.

At Step 420, a character sequence having the highest probability corresponding to the word of the multi-syllable language is calculated with a search algorithm based on the occurrence probability of each character pair in the language model and the translation probability of each syllable/sub-syllable pair obtained from the above transliteration model. Similar to the searching process in the above embodiments, in the present embodiment, said search is performed with the Viterbi algorithm. However, other search algorithms may also be used, such as A* algorithm, depth first algorithm and breadth first algorithm, etc. These algorithms may also be used in combination.

Finally, at Step 425, said character sequence is outputted as a transliteration result of the single-syllable language.

From the above description it can be known that automatic transliteration from a multi-syllable language to a single-syllable language can be efficiently realized by using the method for transliteration from a multi-syllable language to a single-syllable language of the present embodiment, and since there is no need to use voice synthesis to accomplish transliteration processing, reliability and accuracy is improved.

Figure 5:
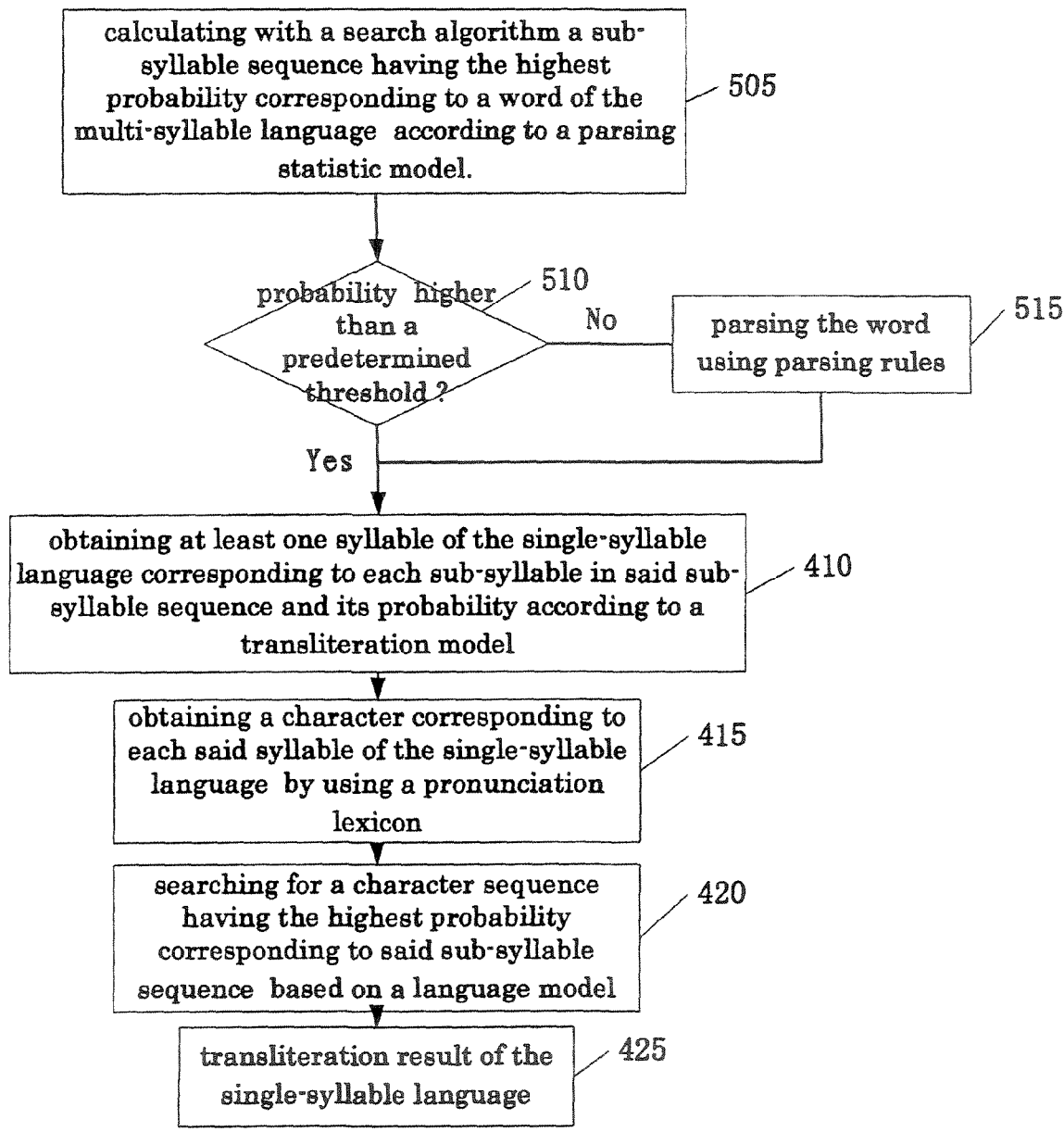
FIG. 5 is a flowchart of the method for transliteration from a multi-syllable language to a single-syllable language according to another embodiment of the invention.

FIG. 5 is a flowchart of the method for transliteration from a multi-syllable language to a single-syllable language according to another embodiment of the invention. The present embodiment will be described in the following in conjunction with the drawing. For the same elements as those in the above embodiments, same character is labeled in the drawing and the description of which will be properly omitted.

As shown in FIG. 5, the difference between the method of the present embodiment and the previous embodiments is in Step 505-515. At Step 505, a sub-syllable sequence having the highest probability corresponding to a word of the multi-syllable language is calculated with a search algorithm according to a parsing statistic model.

Then, at Step 510, it is determined whether the highest probability calculated in the previous Step 505 is higher than a predetermined threshold. If the probability is higher than the threshold, the process proceeds to Step 410 and the subsequent processing is the same as the embodiment shown in FIG. 4; otherwise, the process proceeds to Step 515.

At Step 515, the word is parsed using parsing rules, then Step 410 and subsequent processing are performed.

Thus, in the present embodiment, when parsing result with enough reliability can not be obtained by using a parsing statistic model, parsing rules are used to perform the parsing, thereby making up the deficiency in the parsing statistic model and ensuring a basic accuracy.

Figure 6:
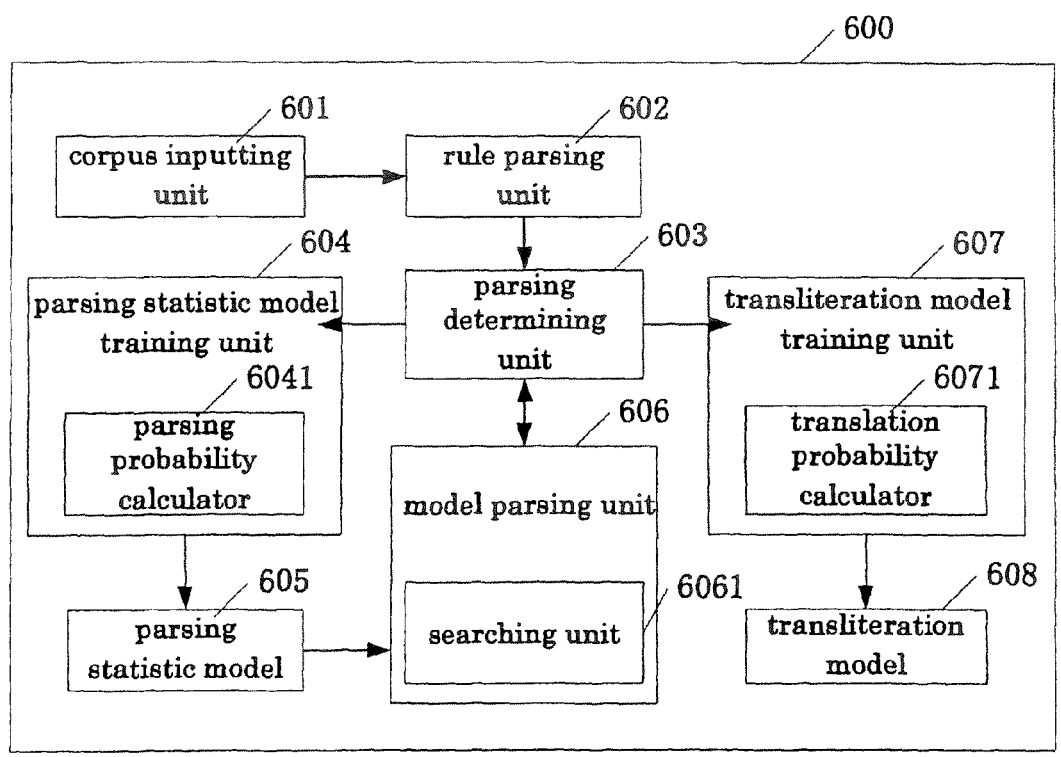
FIG. 6 is a block diagram of the apparatus for training a parsing statistic model and a transliteration model according to one embodiment of the invention.

FIG. 6 is a block diagram of the apparatus for training a parsing statistic model and a transliteration model according to one embodiment of the invention. The present embodiment will be described in the following in conjunction with the drawing. For the same elements as those in the above embodiments, the description of which will be properly omitted.

As shown in FIG. 6, the apparatus 600 for training a parsing statistic model and a transliteration model of the present embodiment includes: a corpus inputting unit 601 configured to input a bilingual proper name list as corpus; a rule parsing unit 602 configured to parse proper names of multi-syllable language in said bilingual proper name list into sub-syllable sequences using parsing rules; a parsing determining unit 603 configured to determine whether a parsing of said proper name of multi-syllable language is correct according to the corresponding proper name of said single-syllable language in said bilingual proper name list; and a parsing statistic model training unit 604 configured to train said parsing statistic model based on the result of parsing that is determined as correct. Wherein, the parsing statistic model training unit 604 includes a parsing probability calculator 6041 configured to calculate an occurrence probability of each pair of adjacent sub-syllables based on the adjacent relationships among sub-syllables in the sub-syllable sequences parsed from proper names of multi-syllable language that are determined as correct. These sub-syllable pairs and the calculated occurrence probabilities of these sub-syllable pairs are recorded in the parsing statistic model 605.

As shown in FIG. 6, the apparatus 600 further includes: a model parsing unit 606 configured to parse the proper name of multi-syllable language that is determined as incorrectly parsed into a sub-syllable sequence by using said parsing statistic model; a transliteration model training unit 607 configured to train said transliteration model based on the proper names of the multi-syllable language that are determined as correctly parsed and the corresponding proper names of the single-syllable language in said bilingual proper name list. Wherein, the model parsing unit 606 includes a searching unit 6061 configured to calculate with a search algorithm based on said parsing statistic model a sub-syllable sequence with the highest probability after parsing the word of the multi-syllable language. The transliteration model training unit 607 includes a translation probability calculator 6071 configured to calculate a translation probability of each sub-syllable/syllable pair based on the corresponding relationship between each sub-syllable in the sub-syllable sequences parsed from said proper names of multi-syllable language that are determined as correctly parsed and the corresponding syllable in the corresponding proper names of single-syllable language. These sub-syllable/syllable pairs and the calculated translation probabilities (occurrence probabilities) of the sub-syllable/syllable pairs are recorded in the transliteration model 608.

The structure of the parsing statistic model and the transliteration model, the parsing of a word of the multi-syllable language and searching method etc. have been described in detail above and will not be repeated here.

The apparatus 600 for training a parsing statistic model and a transliteration model in the present embodiment and its respective components can be constructed with a specialized circuit or chip or be implemented by a computer (processor) executing a corresponding program. Also, the apparatus 600 for training a parsing statistic model and a transliteration model of the present embodiment may operationally implement the method for training a parsing statistic model and/or a transliteration model in the embodiments described in conjunction with FIGS. 1 and 2.

Figure 7:
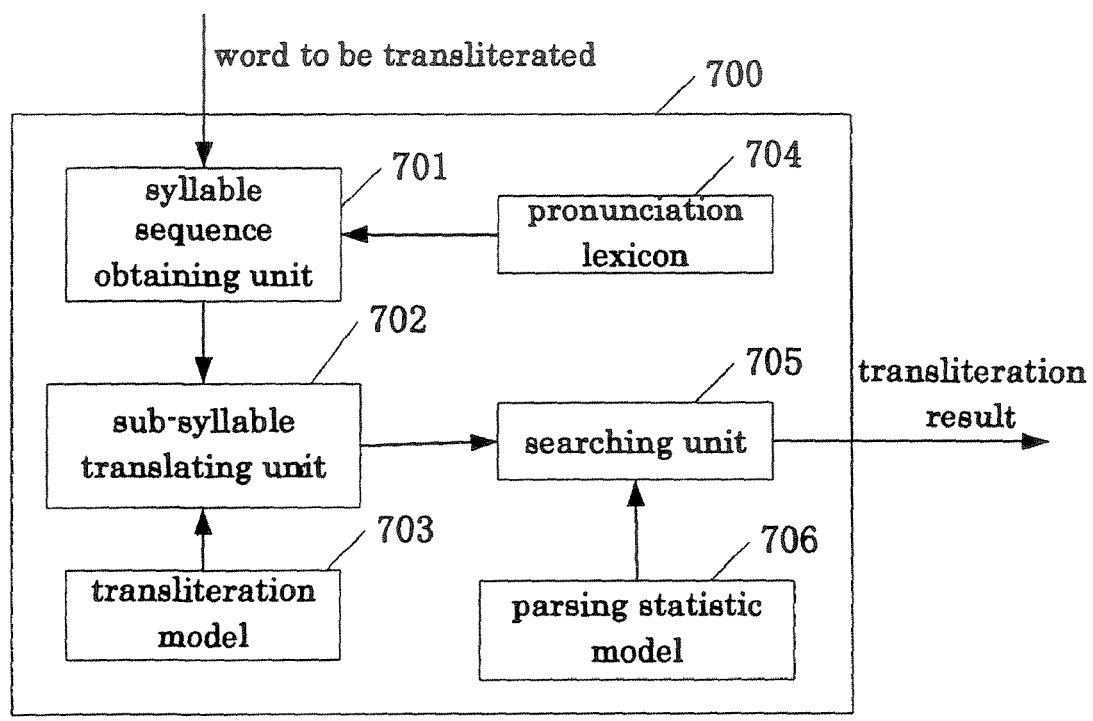
FIG. 7 is a block diagram of the apparatus for transliteration from a single-syllable language to a multi-syllable language according to one embodiment of the invention.

FIG. 7 is a block diagram of the apparatus for transliteration from a single-syllable language to a multi-syllable language according to one embodiment of the invention. The present embodiment will be described in the following in conjunction with the drawing. For the same elements as those in the above embodiments, the description of which will be properly omitted.

As shown in FIG. 7, the apparatus 700 for transliteration from a single-syllable language to a multi-syllable language of the present embodiment includes: a syllable sequence obtaining unit 701 configured to obtain a syllable sequence corresponding to a word of said single-syllable language to be transliterated; a pronunciation lexicon 704 that records therein the pronunciation of characters of said single-syllable language, such as Chinese Pinyin; a transliteration model 703 including translation relationships between syllables of said single-syllable language and sub-syllables of said multi-syllable language and their translation probabilities respectively; a sub-syllable translating unit 702 configured to obtain at least one sub-syllable of said multi-syllable language corresponding to each syllable in said syllable sequence and its translation probability by using said transliteration model 703; a parsing statistic model 706 including sub-syllable parsing probabilities of said multi-syllable language; a searching unit 705 configured to search for a sub-syllable sequence having the highest probability corresponding to said syllable sequence obtained by the syllable sequence obtaining unit 701 as a transliteration result by using said parsing statistic model 706 and said at least one sub-syllable of said multi-syllable language corresponding to each syllable in said syllable sequence and its translation probability obtained by the sub-syllable translating unit 702.

The structure of the parsing statistic model and the transliteration model, the translating of syllable and sub-syllable and searching method etc. have been described in detail above and will not be repeated here.

The apparatus 700 for transliteration from a single-syllable language to a multi-syllable language in the present embodiment and its respective components can be constructed with a specialized circuit or chip or be implemented by a computer (processor) executing a corresponding program. Also, the apparatus 700 for transliteration from a single-syllable language to a multi-syllable language of the present embodiment may operationally implement the method for transliteration from a single-syllable language to a multi-syllable language in the embodiments described in conjunction with FIG. 3.

Figure 8:
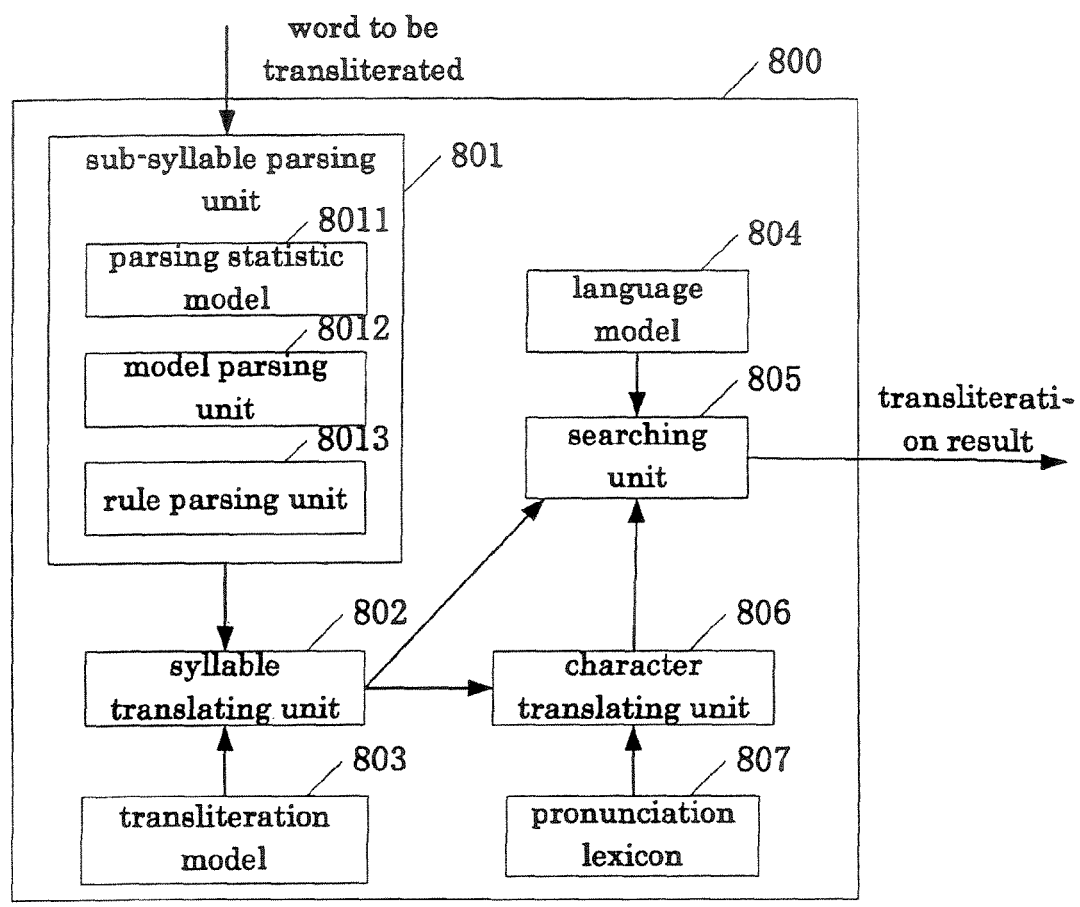
FIG. 8 is a block diagram of the apparatus for transliteration from a multi-syllable language to a single-syllable language according to one embodiment of the invention.

FIG. 8 is a block diagram of the apparatus for transliteration from a multi-syllable language to a single-syllable language according to one embodiment of the invention. The present embodiment will be described in the following in conjunction with the drawing. For the same elements as those in the above embodiments, the description of which will be properly omitted.

As shown in FIG. 8, the apparatus 800 for transliteration from a multi-syllable language to a single-syllable language of the present embodiment includes: a sub-syllable parsing unit 801 configured to parse a word of said multi-syllable language that needs to be transliterated into a sub-syllable sequence; a transliteration model 803 including translation relationships between syllables of said single-syllable language and sub-syllables of said multi-syllable language and their translation probabilities respectively; a syllable translating unit 802 configured to obtain at least one syllable of said single-syllable language corresponding to each sub-syllable in said sub-syllable sequence parsed from the sub-syllable parsing unit 801 and its translation probability by using said transliteration model 803; a character translating unit 806 configured to obtain a character corresponding to each said syllable of said single-syllable language; a language model 804 including character adjacent probabilities of said single-syllable language; a searching unit 805 configured to search for a character sequence having the highest probability corresponding to said sub-syllable sequence as a transliteration result by using said language model 804 and said at least one syllable of said single-syllable language corresponding to each sub-syllable in said sub-syllable sequence and its translation probability obtained by said syllable translating unit 802.

Wherein, the sub-syllable parsing unit 801 may further include: a parsing statistic model 8011 including sub-syllable parsing probabilities of said multi-syllable language; a model parsing unit 8012 configured to calculate a sub-syllable sequence having the highest probability corresponding to said word of the multi-syllable language using a search algorithm based on said parsing statistic model; and a rule parsing unit 8013 configured to parse said word of the multi-syllable language into a sub-syllable sequence using parsing rules.

The structure of the parsing statistic model, language model and transliteration model, the parsing of a word of the multi-syllable language, the translating of syllables and sub-syllables as well as search method etc. have been described in detail above and will not be repeated here.

The apparatus 800 for transliteration from a multi-syllable language to a single-syllable language in the present embodiment and its respective components can be constructed with a specialized circuit or chip or be implemented by a computer (processor) executing a corresponding program. Also, the apparatus 800 for transliteration from a multi-syllable language to a single-syllable language of the present embodiment may operationally implement the method for transliteration from a multi-syllable language to a single-syllable language in the embodiments described in conjunction with FIGS. 4 and 5.

Though a method and apparatus for training parsing statistic model and transliteration model, and a method and apparatus for transliteration from a single-syllable language to a multi-syllable language and from a multi-syllable language to a single-syllable language have been described in details with some exemplary embodiments, these embodiments are not exhaustive. Those skilled in the art may make various variations and modifications within the spirit and scope of the present invention. Therefore, the present invention is not limited to these embodiments; rather, the scope of the present invention is only defined by the appended claims.

The invention claimed is:

1. An apparatus for training a parsing statistic model, which is to be used in transliteration between a single-syllable language and a multi-syllable language and includes sub-syllable parsing probabilities of said multi-syllable language, comprising:
  a corpus inputting unit configured to input a bilingual proper name list as corpus, said bilingual proper name list includes a plurality of proper names of said multi-syllable language and corresponding proper names of said single-syllable language respectively;
  a rule parsing unit configured to parse said plurality of proper names of multi-syllable language in said bilingual proper name list into sub-syllable sequences using parsing rules;
  a parsing determining unit configured to determine whether a parsing of said proper name of multi-syllable language is correct according to the corresponding proper name of said single-syllable language in said bilingual proper name list; and
  a parsing statistic model training unit configured to train said parsing statistic model base on the result of parsing that is determined as correct.

2. The apparatus for training a parsing statistic model according to claim 1, wherein said parsing determining unit is configured to determine whether the number of sub-syllables in said sub-syllable sequence parsed from said proper name of said multi-syllable language is equal to the number of syllables in said corresponding proper name of single-syllable language in said bilingual proper name list, and if it is equal, the parsing is determined as correct, otherwise the parsing is determined as incorrect.

3. The apparatus for training a parsing statistic model according to claim 1 or 2, further comprising:
  a model parsing unit configured to parse the proper name of multi-syllable language that is determined as incorrectly parsed again using said parsing statistic model.

4. The apparatus for training a parsing statistic model according to claim 1, wherein said parsing statistic model training unit further comprises:
  a parsing probability calculator configured to calculate an occurrence probability of each pair of adjacent sub-syllables based on the adjacent relationships among sub-syllables in the sub-syllable sequences parsed from said proper names of multi-syllable language that are determined as correct.

5. An apparatus for transliteration from a single-syllable language to a multi-syllable language, comprising:

a syllable sequence obtaining unit configured to obtain a syllable sequence corresponding to a word of said single-syllable language to be transliterated;

a transliteration model including translation relationships between syllables of said single-syllable language and sub-syllables of said multi-syllable language and their translation probabilities respectively;

a sub-syllable translating unit configured to obtain at least one sub-syllable of said multi-syllable language corresponding to each syllable in said syllable sequence obtained by said syllable sequence obtaining unit and its translation probability by using said transliteration model;

a parsing statistic model including sub-syllable parsing probabilities of said multi-syllable language;

a searching unit configured to search for a sub-syllable sequence having the highest probability corresponding to said syllable sequence as a transliteration result based on said parsing statistic model and said at least one sub-syllable of said multi-syllable language corresponding to each syllable in said syllable sequence and its translation probability.

6. The apparatus for transliteration from a single-syllable language to a multi-syllable language according to claim 5 further comprising:

a pronunciation lexicon including character pronunciations of said single-syllable language;

wherein said syllable sequence obtaining unit is configured to obtain a syllable sequence corresponding to a word of said single-syllable language based on said pronunciation lexicon.

7. The apparatus for transliteration from a single-syllable language to a multi-syllable language according to claim 5, wherein said searching unit is configured to calculating with a search algorithm to find the sub-syllable sequence having the highest probability based on said at least one sub-syllable of said multi-syllable language corresponding to each syllable in said syllable sequence and its translation probability, and the sub-syllable parsing probabilities in said parsing statistic model.

8. The apparatus for transliteration from a single-syllable language to a multi-syllable language according to claim 7, wherein said search algorithm is any one or a combination of depth first search, breadth first search, A* search and Viterbi algorithm.

9. An apparatus for transliteration from a multi-syllable language to a single-syllable language, comprising:

a sub-syllable parsing unit configured to parse a word of said multi-syllable language that needs to be transliterated into a sub-syllable sequence;

a transliteration model including translation relationships between syllables of said single-syllable language and sub-syllables of said multi-syllable language and their translation probabilities respectively;

a syllable translating unit configured to obtain at least one syllable of said single-syllable language corresponding to each sub-syllable in said sub-syllable sequence and its translation probability according to said transliteration model;

a character translating unit configured to obtain a character corresponding to each said syllable of single-syllable language;

a language model including character adjacent probabilities of said single-syllable language;

a searching unit configured to search for a character sequence having the highest probability corresponding to said sub-syllable sequence as a transliteration result based on said language model and said at least one syllable of said single-syllable language corresponding to each sub-syllable in said sub-syllable sequence and its translation probability obtained by said syllable translating unit.

10. The apparatus for transliteration from a multi-syllable language to a single-syllable language according to claim 9, wherein said sub-syllable parsing unit further comprises:

a parsing statistic model including sub-syllable parsing probabilities of said multi-syllable language;

a model parsing unit configured to calculate to find a sub-syllable sequence having the highest probability corresponding to said word of multi-syllable language using a search algorithm based on said parsing statistic model.

11. The apparatus for transliteration from a multi-syllable language to a single-syllable language according to claim 10, wherein said sub-syllable parsing unit further comprises:

a rule parsing unit configured to parse said word of multi-syllable language using parsing rules.

12. The apparatus for transliteration from a multi-syllable language to a single-syllable language according to claim 9, further comprising:

a pronunciation lexicon including character pronunciations of said single-syllable language.

13. The apparatus for transliteration from a multi-syllable language to a single-syllable language according to claim 9, wherein said searching unit is configured to calculate with a search algorithm to find the character sequence having the highest probability based on at least one character of said single-syllable language corresponding to each sub-syllable in said sub-syllable sequence and its translation probability, and the character adjacent probabilities in said language model.

14. The apparatus for transliteration from a multi-syllable language to a single-syllable language according to claim 10 or 13, wherein said search algorithm is any one or a combination of depth first search, breadth first search, A* search and Viterbi algorithm.

* * * * *